(12) United States Patent
Yen

(10) Patent No.: US 7,609,466 B2
(45) Date of Patent: Oct. 27, 2009

(54) LENS MODULE AND OPTICAL MODULE INCORPORATING THE SAME

(75) Inventor: Shih-Chieh Yen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/168,785

(22) Filed: Jul. 7, 2008

(65) Prior Publication Data
US 2009/0190241 A1    Jul. 30, 2009

(30) Foreign Application Priority Data
Jan. 24, 2008    (CN)    .................... 2008 1 0300210

(51) Int. Cl.
*G02B 7/02* (2006.01)
(52) U.S. Cl. ................................. 359/819
(58) Field of Classification Search ......... 359/819, 359/811, 793, 784, 821, 829, 830; 396/529
See application file for complete search history.

(56) References Cited

U.S. PATENT DOCUMENTS 5,024,509 A * 6/1991 Kurihara .................... 359/741
6,592,077 B2 * 7/2003 Uhlemann et al. .......... 244/129.3
7,088,530 B1 * 8/2006 Recco et al. ................ 359/811

\* cited by examiner

*Primary Examiner*—Ricky L Mack
*Assistant Examiner*—Vipin M Patel
(74) *Attorney, Agent, or Firm*—Andrew C. Cheng

(57) ABSTRACT

A lens module includes a first lens and a second lens. The first lens includes a first central round portion and a first peripheral portion. The first peripheral portion has a first radially extending portion surrounding the first central round portion, and a first axially extending portion extending from the first radially extending portion. The first radially extending portion has a plurality of through holes defined therein. The second lens includes a second central round portion and a second peripheral having a second radially extending portion surrounding the second central round portion, and a second axially extending portion extending from the second radially extending portion. The second axially extending portion fittingly engaged in the first axially extending portion. The second axially extending portion and the first lens cooperatively define an inner space. The through holes are in communication with the inner space.

14 Claims, 2 Drawing Sheets

LENS MODULE AND OPTICAL MODULE INCORPORATING THE SAME

BACKGROUND

1. Technical Field

The invention relates generally to optical modules, and particularly to a lens module and an optical module incorporating the lens module.

2. Description of Related Art

Currently, along with the development of electronic devices with multiple functions, image pick-up apparatuses have become widely used in a variety of consumer electronic devices, such as notebook computers, personal digital assistants (PDAs), cellular telephones, etc. In the meantime, there is an increasingly demand for improving image quality, which is essentially depended on the quality of a lens module of the image pick-up apparatus. That is, a lens module with high image quality is desired.

A lens module generally includes a barrel, a plurality of lenses received in the barrel. In addition, the plurality of lenses is assembled along an axis direction of the barrel in order to perform optical function.

In such case, in order to ensure that the lenses can be precisely and firmly mounted inside the barrel, the lenses must be precisely manufactured with the external diameter thereof substantially equal to the inner diameter of the barrel. However, the equal diameters may cause friction between the lateral sides of the lenses and the inside wall of the barrel. Therefore, it is understood that the friction makes it difficult to assemble the lenses with the barrel. Accordingly, the lenses may be placed improperly in the barrel, e.g. not straightly. As a result, the assembling efficiency is lowered and the image quality of the yielded lens module is unsatisfactory. Furthermore, yield for lens module is reduced and cost for that is raised.

What is needed, therefore, is a lens module having improved efficiency on assembling and improved performance on optical quality.

SUMMARY

A lens module is provided. In one present embodiment, the lens module includes a first lens and a second lens. The first lens includes a first central round portion and a first peripheral portion. The first peripheral portion has a first radially extending portion surrounding the first central round portion, and a first axially extending portion extending from the first radially extending portion. The first radially extending portion has a plurality of through holes defined therein. The second lens includes a second central round portion and a second peripheral having a second radially extending portion surrounding the second central round portion, and a second axially extending portion extending from the second radially extending portion. The second axially extending portion fittingly engaged in the first axially extending portion. The second axially extending portion and the first lens cooperatively define an inner space. The through holes are in communication with the inner space. An optical module with the lens module is also provided.

BRIEF DESCRIPTION OF THE DRAWINGS

The components in the drawing are not necessarily drawn to scale, the emphasis instead being placed upon clearly illustrating the principles of the present invention.

Corresponding reference characters indicate corresponding parts. The exemplifications set out herein illustrate at least one present embodiment of the present lens module, in one form, and such exemplifications are not to be construed as limiting the scope of the invention in any manner.

DETAILED DESCRIPTION OF THE EMBODIMENT

Reference will now be made to the drawings to describe embodiments of the present lens module in detail.

Figure 1:
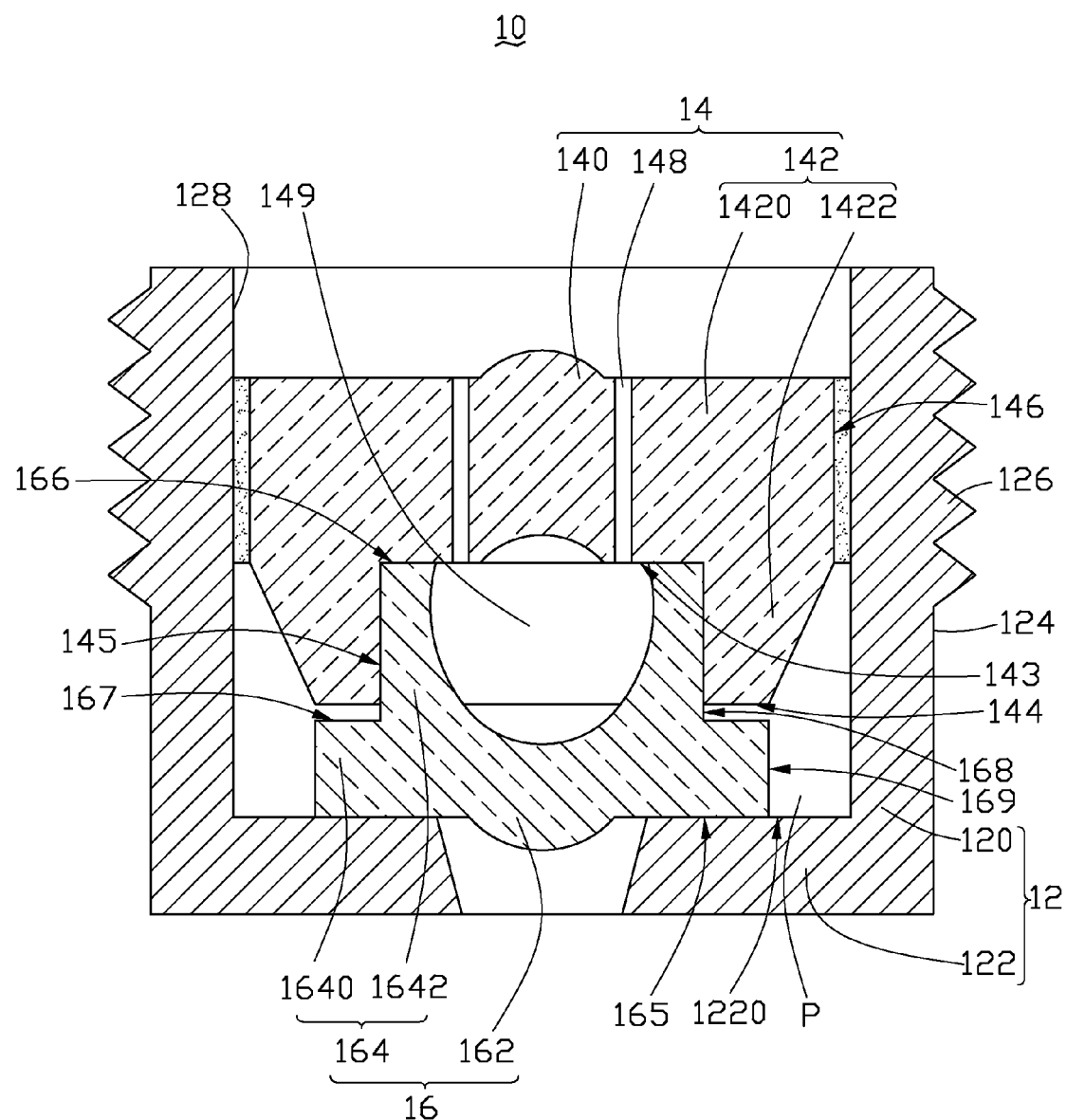
FIG. 1 is a schematic, cross-sectional view of an optical module in accordance with a present embodiment of the present invention.
Figure 2:
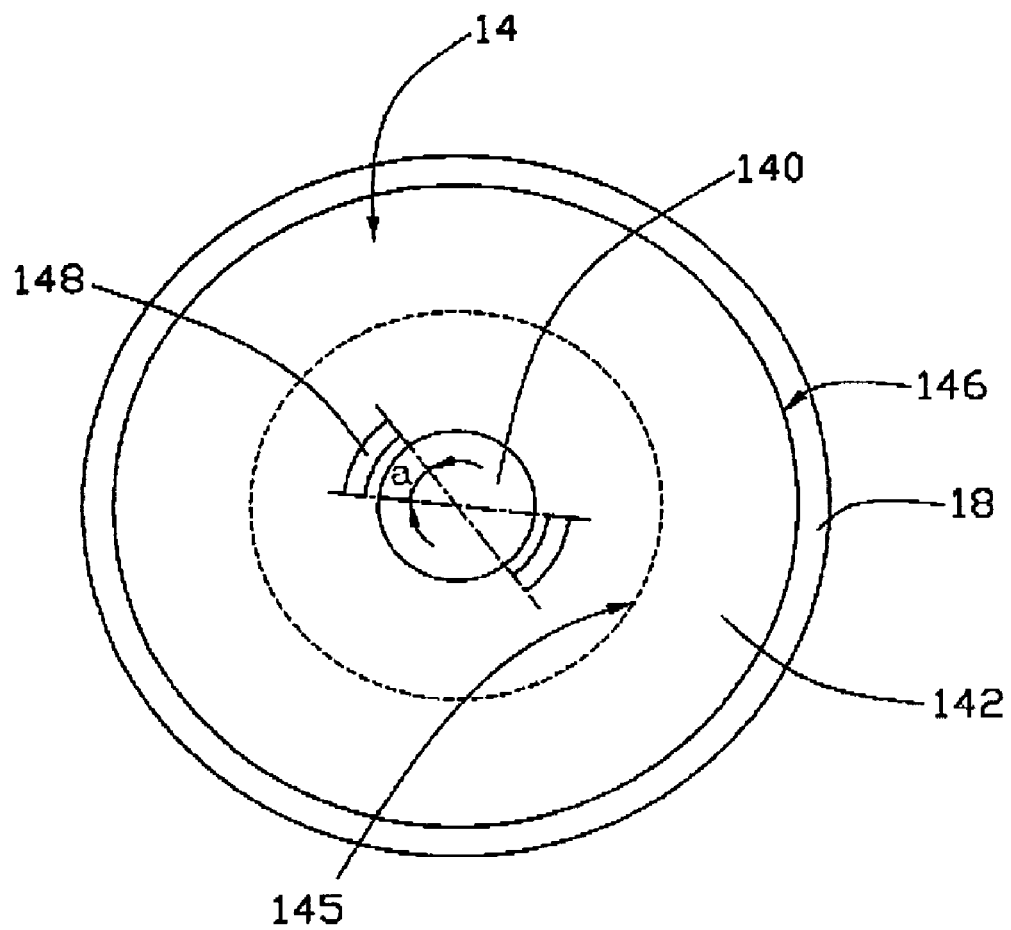
FIG. 2 is a top view of the first lens in FIG. 1, a glue applied to the first lens is also shown.

Referring to FIG. 1 and FIG. 2, an optical module 10 in accordance with a present embodiment, is shown. The optical module 10 includes a barrel 12, a first lens 14 and a second lens 16 received in the barrel 12. The first lens 14 and the second lens 16 can be made of plastic, glass or other optical materials known by person in the skill. In the present embodiment, the optical module 10 can be installed into the electronic devices, such as notebook computers, personal digital assistants (PDAs), or cellular telephones.

The barrel 12 is a cylindrical barrel and can be made of resin. The barrel 12 defines an inner space (not labeled) therein to accommodate the first lens 14 and the second lens 16. In the present embodiment, the barrel 12 includes a cylindrical body 120 and an annular part 122. Advantageously, an outer sidewall 124 of the barrel 12 has a plurality of threads 126 formed thereon so that the barrel 12 can be screwed to a holder (not shown).

The annular part 122 is formed in the cylindrical body 120. Particularly, the annular part 122 is inwardly extended from the cylindrical body 120 at a lower end thereof. The annular part 122 is configured for holding the second lens 16 thereon. The annular part 122 includes a holding surface 1220 facing towards the inner space of the barrel 12. The annular part 122 and the cylindrical body 120 can be integrally formed. Alternatively, the annular part 122 and the cylindrical body 120 can be separately made and are assembled into a whole barrel 12.

The second lens 16 is accommodated in the barrel 12. The second lens 16 includes a central round portion 162 and a peripheral stepped structure 164 surrounding the central round portion 162. The central round portion 162 is configured for performing image picking-up function. The peripheral stepped structure 164 includes a second radially extending portion 1640 surrounding the first central round portion 162, and a second axially extending portion 1642 extending from the second radially extending portion 1640. The peripheral stepped structure 164 has a downward-facing surface 165, a first upward-facing step surface 166, a second upward-facing step surface 167, a first lateral surface 168 interconnected between the first and second upward-facing step surfaces (166, 167), and a second lateral surface 169 adjacent to the second upward-facing step surface 167.

In assembly, the downward-facing surface 165 of the second lens 16 contacts the holding surface 1220 of the annular part 122. In the present embodiment, a gap P is defined between a second lateral surface 169 of the second lens 16 and the inside wall 128 of the cylindrical body 120. That is, the outside most lateral surface 169 of the second lens 16 spaces apart from the inside wall 128 of the barrel 12 by such gap P. In such case, an external diameter for the second lateral surface 169 of the second lens 16 is smaller than an internal diameter for the inside wall 128 of the cylindrical body 120.

Therefore, during the assembling process, the friction between the second lens 16 and the barrel 12 can be avoided effectively.

The first lens 14 includes a central round portion 140 configured for picking up the image and a peripheral stepped structure 142 configured for engaging with the second lens 16 and abutting against the barrel 12. The peripheral stepped structure 142 surrounds the central round portion 140. The peripheral stepped structure 142 includes a first radially extending portion 1420 surrounding the first central round portion 140, and a first axially extending portion 1422 extending from the first radially extending portion 1420. The peripheral stepped structure 142 of the first lens 14 correspondingly has a first downward-facing step surface 143, a second downward-facing step surface 144, an intermediate side surface 145 interconnected between the first downward-facing step surface 143 and a second downward-facing step surface 144, and a lateral surface 146.

In assembly, the second lens 16 is engaged in the peripheral stepped structure 142 of the first lens 14 in a manner that the first lateral surface 168 of the second lens 16 contacts the intermediate side surface 145 of the first lens 14, the first upward-facing step surface 166 of the second lens 16 faces toward the first downward-facing step surface 143 of the first lens 14, and the second upward-facing step surface 167 of the second lens 16 faces toward the second downward-facing step surface 144 of the first lens 14. That is, an external diameter of portion of the second lens 16 where the first lateral surface 168 located is substantially equal to an internal diameter of portion of the first lens 14 where the intermediate side surface 145 located. In the present embodiment, the lateral surface 146 is glued (i.e., adhesively mounted) to the inner sidewall 128 of the cylindrical body 120.

The second lens 16 can be engaged in the first lens 14 by contacting the first lateral surface 168 of the second lens 16 with the intermediate side surface 145 of the first lens 14. In addition, glue can be used for fastening such the lenses 12,14 more tightly.

Referring to FIGS. 1 and 2, in the present embodiment, an internal diameter of the first upward-facing step surface 166 is larger than an external diameter of the central round portion 140. Two though holes 148 with partial-ring-shaped cross sections are defined in the peripheral stepped structure 142 set around the central round portion 140 symmetrically. The through holes 148 ran through the peripheral stepped structure 142 and communicate with an inner space 149 defined by the first lens 14 and the second lens 16 cooperatively. In the present embodiment, a central angle α of the through hole 148 is in a range from 30 degrees to 60 degrees. When the temperature of environment of the optical module 10 changes, the pressure balance between the inner space 149 and atmosphere will be broken/reduced and the distance between the lenses will be changed. In the present embodiment, because the two through holes 148 communicate with the inner space 149 and outside atmosphere allowing the pressure to be adjusted therebetween, distance change between the first lens 14 and the second lens 16 influenced by the temperature is greatly reduced, if not prevented.

It is understood that assembling the lenses 14, 16 with such the step-profiled structures into the barrel 12 is simple. In addition, the second lens 16 can be easily placed in the desired position if the first lens 14 is placed in the right position. The number of the through holes 148 is not limited to two, less or more through holes 148 can be defined in the first lens 14 to adjust the pressure balance between the inner space 149 and outside atmosphere.

It is reasonably that the optical module 10 can include more than two lenses to be assembled in the barrel 12. The lenses are engaged tightly to each other through the step-profiled structures formed thereon.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An optical module comprising:
   a first lens comprising a first central round portion, a first peripheral portion, the first peripheral portion having a first radially extending portion surrounding the first central round portion, and a first axially extending portion extending from the first radially extending portion, the first radially extending portion having a plurality of through holes defined therein;
   a second lens comprising a second central round portion optically aligned with the first central round portion of the first lens, a second peripheral having a second radially extending portion surrounding the second central round portion, and a second axially extending portion extending from the second radially extending portion, the second axially extending portion fittingly engaged in the first axially extending portion, the second axially extending portion and the first lens cooperatively defining an inner space, the through holes in communication with the inner space; and
   a barrel accommodating the first lens and the second lens therein.

2. The optical module as claimed in claim 1, wherein the first peripheral portion comprises a first surface, a second surface, and a side surface interconnected between the first surface and the second surface; the second peripheral portion comprises a first surface, a second surface, a third surface opposite to the first surface and the second surface, a first side surface interconnected between the first surface and the second surface, and a second side surface interconnected between the second surface and the third surface, the second lens is engaged in the first lens in a manner that the first side surface of the second lens contacts the side surface of the first lens, the first surface of the second lens contacts the first surface of the first lens, and the second surface of the second lens faces toward the second surface of the first lens.

3. The optical module as claimed in claim 1, further comprising an adhesive applied between an outer surface of the first lens and an inner surface of the barrel.

4. The optical module as claimed in claim 1, wherein a gap is maintained between an outer surface of the second lens and an inner surface of the barrel.

5. The optical module as claimed in claim 2, wherein the barrel includes a body and an annular part inwardly extending from the body, and the annular part having a holding surface abutting against the second lens.

6. The optical module as claimed in claim 5, wherein the third surface of the second lens contacts the holding surface of the annular part, and an outermost portion of the second side surface of the second lens is spaced apart from an inner surface of the barrel.

7. The optical module as claimed in claim 1, wherein each of the through holes has a cross section bounded by two radii and two included concentric arcs.

8. The optical module as claimed in claim 7, wherein an angle subtended by the included concentric arcs ranges from 30 degrees to 60 degrees.

9. The lens module as claimed in claim 7, wherein a central axis of each of the through holes is parallel to that of the first central round portion of the first lens.

10. The lens module as claimed in claim 1, wherein the plurality of through holes are symmetrically defined around the first central round portion of the first lens.

11. A lens module, comprising:

a first lens comprising a first central round portion, a first peripheral portion, the first peripheral portion having a first radially extending portion surrounding the first central round portion, and a first axially extending portion extending from the first radially extending portion, the first radially extending portion having a plurality of through holes defined therein; and a second lens comprising a second central round portion optically aligned with the first central round portion of the first lens, a second peripheral having a second radially extending portion surrounding the second central round portion, and a second axially extending portion extending from the second radially extending portion, the second axially extending portion fittingly engaged in the first axially extending portion, the second axially extending portion and the first lens cooperatively defining an inner space, the through holes in communication with the inner space.

12. The lens module as claimed in claim 11, wherein the first peripheral portion comprises a first surface, a second surface, and a side surface interconnected between the first surface and the second surface; the second peripheral portion comprises a first surface, a second surface, a third surface opposite to the first surface and the second surface, and a side surface interconnected between the first surface and the second surface, the second lens is engaged in the first lens in a manner that the side surface of the second lens contacts the side surface of the first lens, the first surface of the second lens contacts the first surface of the first lens, and the second surface of the second lens faces toward the second surface of the first lens.

13. The lens module as claimed in claim 11, wherein each of the through holes has a cross section bounded by two radii and two included concentric arcs.

14. The lens module as claimed in claim 11, wherein an angle subtended by the included concentric arcs ranges from 30 degrees to 60 degrees.

* * * * *